(12) United States Patent
Kopetz

(10) Patent No.: US 9,766,964 B2
(45) Date of Patent: Sep. 19, 2017

(54) METHOD FOR DETECTING A FAILURE OF A CONSTITUENT SYSTEM IN A SYSTEM-OF-SYSTEMS

(71) Applicant: FTS Computertechnik GmbH, Vienna (AT)

(72) Inventor: Hermann Kopetz, Baden (AT)

(73) Assignee: FTS COMPUTERTECHNIK GMBH, Vienna (AT)

( * ) Notice: Subject to any disclaimer, the term of this patent is extended or adjusted under 35 U.S.C. 154(b) by 16 days.

(21) Appl. No.: 15/024,938

(22) PCT Filed: Sep. 25, 2014

(86) PCT No.: PCT/AT2014/050217
§ 371 (c)(1),
(2) Date: Mar. 25, 2016

(87) PCT Pub. No.: WO2015/042626
PCT Pub. Date: Apr. 2, 2015

(65) Prior Publication Data
US 2016/0232046 A1 Aug. 11, 2016

(30) Foreign Application Priority Data
Sep. 27, 2013 (AT) .............................. A 50627/2013

(51) Int. Cl.
*G06F 11/00* (2006.01)
*G06F 11/07* (2006.01)
(52) U.S. Cl.
CPC ........ *G06F 11/076* (2013.01); *G06F 11/0709* (2013.01); *G06F 11/079* (2013.01); *G06F 11/0757* (2013.01); *G06F 11/0772* (2013.01)

(58) Field of Classification Search
USPC .......................................... 714/55
See application file for complete search history.

(56) References Cited

U.S. PATENT DOCUMENTS

| 8,832,500 B2* | 9/2014 | Nixon ....................... G06F 1/10 714/30 |
| 2005/0102586 A1* | 5/2005 | Chiu ................... G06F 11/2007 714/56 |
| 2013/0159780 A1* | 6/2013 | Bedwell .............. G06F 11/3466 714/45 |

* cited by examiner

*Primary Examiner* — Sarai Butler
(74) *Attorney, Agent, or Firm* — Eversheds Sutherland (US) LLP

(57) ABSTRACT

A process to detect a failure of a constituent system (110 . . . 113) in a system of systems (1) consisting of a number of constituent systems (111 . . . 113) which exchange messages through a communications system (120), in which every constituent system (111 . . . 113) has a global time with a known granularity g, and at least one constituent system creates, at periodic creation times (210, 211) determined a priori from the progression of the global time, a time-triggered life-sign message, the time of transmission (211, 221) of this life-sign message in the time-triggered communications system (120), determined a priori from the progression of the global time, is synchronized with the creation time of this life-sign message, and the time of receipt (212, 222) of this life-sign message, determined a priori from the progression of the global time, is synchronized with the timeout time point (213, 223), determined a priori from the progression of the global time, of a monitor (130) of this life-sign message monitoring the arrival of the life-sign message, wherein an error message is triggered at the timeout time point if no life-sign message has arrived at the expected time of receipt (222).

5 Claims, 1 Drawing Sheet

METHOD FOR DETECTING A FAILURE OF A CONSTITUENT SYSTEM IN A SYSTEM-OF-SYSTEMS

Figure 1:
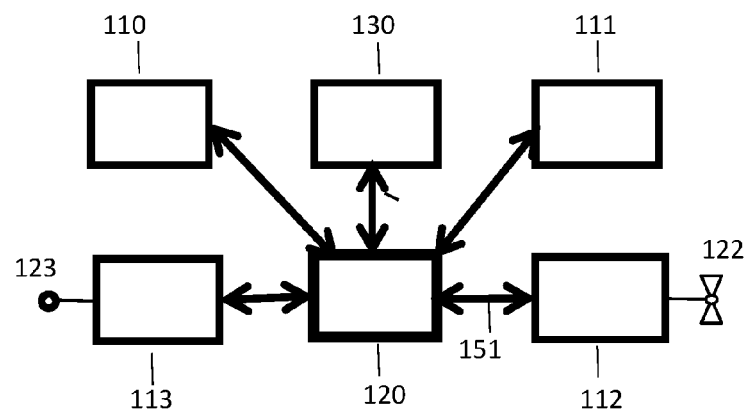

The invention relates to a process to detect a failure of a constituent system in a system of systems consisting of a number of constituent systems which exchange messages through a communications system.

This invention is in the area of computer engineering and it describes an innovative process that allows extremely rapid detection of a subsystem failure in a system of systems.

Integration of existing electronic data processing systems (legacy systems) or newly developed electronic data processing systems into a system of systems makes it possible to offer new services and realize economic advantages. In the technical literature (Jamshidi, M., Ed. *System of Systems Engineering—Innovations for the 21st Century*, J. Wiley & Sons. 2009]) the term constituent system has been widely adopted for a subsystem of a system of systems.

Since the constituent systems of a system of systems are developed and/or operated by different organizations which pursue their own goals, to which they give priority, a constituent system can be turned off for a short time by the local operator, or fail for other reasons, e.g., hardware or software errors. From the perspective of a system of systems, immediate detection of a failure of a constituent system—minimizing the error detection latency—is of great importance, since rapid error detection represents a necessary prerequisite for taking timely measures for handling an error. For example, it is decisive for the error latency to be as short as possible to minimize the consequences of an error in a moving system. For example, if a camera fails in a moving system, the movement can be stopped immediately to prevent an accident. The later the movement is stopped, the more probable the occurrence of an accident is.

A widespread method of error detection is the time monitoring, by a monitor component, of a periodic life-sign message of a constituent system. A life-sign message is a message whose receipt allows a recipient to infer that the sender of this message had not failed at the creation time of the life-sign message. If a monitor component, whose task it is to monitor the orderly operation of a system of systems, should find that a life-sign message has not arrived before the expected timeout time point, then the monitor component can immediately take suitable measures to circumvent the error. Since in the time interval between the occurrence of an error and the detection of an error the consequences of an error can propagate without hindrance, it is important to keep this time interval—the error detection latency—as short as possible.

According to the current prior art, the period of the life-sign message is determined from the progression of the local clock in the constituent system to be monitored. Since many systems do not have any global time available, the communications system functions in an event-driven manner (Kopetz, H. Real-Time Systems, *Design Principles for Distributed Embedded Applications*. Springer Verlag. 2011, p. 178). The large jitters of an event-driven communications system makes it necessary to set a corresponding timeout, so that the error detection latency is long (see the example at the end of the section Description of an implementation).

The invention is based on the goal of minimizing the time interval between the occurrence of an error in a constituent system and the detection of the error in a system of systems. This goal is achieved by an inventive process of the type mentioned at the beginning, in which every constituent system has a global time with a known granularity g, and at least one constituent system creates, at periodic creation times determined a priori from the progression of the global time, a time-triggered life-sign message, the time of transmission of this life-sign message in the time-triggered communications system, determined a priori from the progression of the global time, is synchronized with the creation time of this life-sign message, and the time of receipt of this life-sign message, determined a priori from the progression of the global time, is synchronized with the timeout time point, determined a priori from the progression of the global time, of a monitor of this life-sign message monitoring the arrival of the life-sign message, wherein an error message is triggered at the timeout time point if no life-sign message has arrived at the expected time of receipt.

Accordingly, the time interval between the occurrence of a error and the detection of the error is minimized by an a priori planned synchronization, realized through a global time, of the periodic creation time of the life-sign message with the message's time of transmission in a time-triggered communications system, and further by an a priori planned synchronization of the periodic time of receipt of the life-sign message with the message's timeout time point in the monitor component.

An advantageous variant of the inventive process provides that the time interval, measured with the global time, between the creation time of the life-sign message and the time of transmission of this message is $n \cdot g$, where g means the granularity of the global time and n is a natural number where $n \geq 2$.

Furthermore, it can be expedient for the time interval, measured with the global time, between the time of receipt of the life-sign message and the timeout time point of this message to be $n \cdot g$, where g means the granularity of the global time and n is a natural number where $n \geq 2$.

Another variant advantageously provides that an error handling process is begun with the triggering of the error message.

It is also recommended for a life-sign message to be sent at the end of every cycle in a cyclical computer system, that is, even in all cycles in which the result is not yet provided, so that an error of the producer is immediately detected and the error detection latency is kept minimal.

Figure 2:
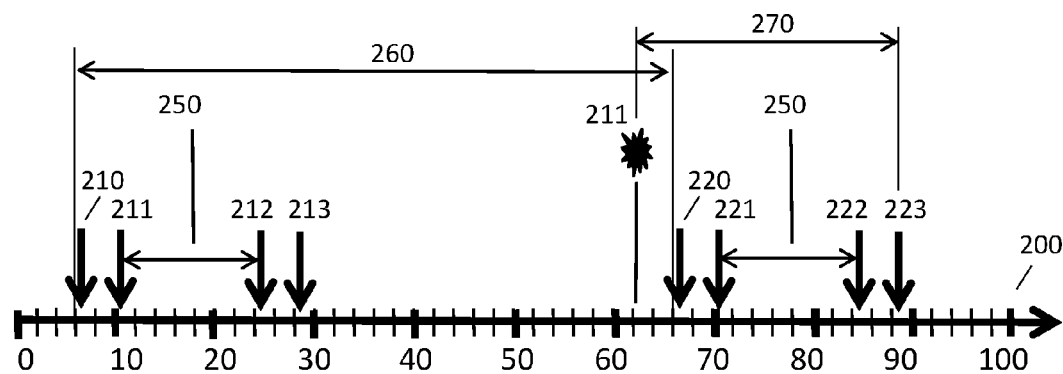

The invention, along with further advantages, is explained in detail below using sample embodiments that are illustrated in the drawing. The figures are as follows:

FIG. 1 shows the structure of a system of systems; and
FIG. 2 shows the time sequence of the transport of a life-sign message in the inventive process.

Before the invention is described in detail on the basis of a sample embodiment, some of the terms used will be defined, to avoid lengthy repetitions.

Constituent System: An autonomous subsystem of a system of systems.

Time of Receipt of a Message: The time point at which the complete message is delivered to a recipient. In a time-triggered communications system, the periodic times of receipt are inferred a priori from the progression of the global time.

Creation Time of a Message: The time point at which a message is generated by a producer.

Error Detection Latency: The time interval between a failure and the detection of the failure.

Global Time: An abstraction of the synchronized times of the local clocks in some or all constituent systems of a system of systems. The granularity g of the global time follows from the precision of the clock synchronization; see [Kopetz, loc. cit., pp. 58-63].

Jitter of Message Transport: the difference between minimum and maximum transport duration.

Life-Sign Message: A periodic message whose receipt allows a recipient to infer that the sender of this message had not failed at the life-sign message's creation time.

Legacy System: An existing electronic data processing system that is integrated into a system of systems. Integration makes the legacy system into a constituent system.

Time of Transmission of a Message: The time point at which the transmission of a message through a communications system is begun. In a time-triggered communications system, the periodic times of transmission are inferred a priori from the progression of the global time.

Synchronization of Two Events: Generally: the time coordination of two events. In the context of this patent specification: the time-coordinated sequence of two events.

System of Systems: A system of systems is an integration of a finite number of constituent systems which are independent and operable, and which are networked together for a period of time to achieve a certain higher goal, from [Barot, V. et al. *T-Area SoS State of the Art Report*. Report No. TAREA-PU-WP2-R-LU-9. Loughborough University. England. 2012.] and [Kopetz, loc. cit.].

Timeout Time Point: The time point at which it is determined that an expected event (e.g., the receipt of an expected message) has not arrived.

Time-Triggered Communications System: A communications system in which the periodic times of transmission of the messages are determined a priori from the progression of the global time in such a way that there are no time conflicts in the message transport, e.g., TTEthernet [Jamshidi, loc. cit.].

Cyclical Computer System: A computer system in which the data is processed in cycles. At the beginning of a cycle, the input data is read from the environment and the output data is delivered to the environment before the end of a cycle.

FIG. 1 shows the structure of a system of systems consisting of the four constituent systems 110, 111, 112, and 113, the message distribution unit 120, and the monitor component 130. The four constituent systems 110, 111, 112, and 113 and the monitor component 130 are connected with the message distribution unit 120 through bidirectional communication channels 151. The constituent system 112 has an actuator 122, e.g., a valve, connected to it, and the constituent system 113 has a sensor 123, e.g., a camera, connected to it. The message distribution unit conveys time-triggered messages, e.g., by means of the TTEthernet protocol [SAE Standard AS6802 on TTEthernet. URL: http://standards.sae.org/as6802]. The four constituent systems 110, 111, 112, 113, the message distribution unit 120, and the monitor component 130 have access to a global time with the granularity g. The global time is based either on an internal synchronization algorithm, as described in ([Kopetz, loc. cit., pp. 66-73]), or on the receipt of GPS signals (see [Kopetz, loc. cit., p. 74]). The internal synchronization can be error-tolerant.

FIG. 2 shows the time sequence of the error detection assuming a global time, with which the events 211, 212, and 213 are synchronized, and a time-triggered TTEthernet communications system. The ticks of the global time are entered on the abscissa 200. In the example in FIG. 2, it is assumed that the granularity of the global time, i.e., the interval between two ticks, is 2 µs. The granularity g of the global time follows from the precision of the clock synchronization, as in [Kopetz, loc. cit., p. 58].

In the example in FIG. 2, the communications system 120 is realized by 100 Mbit TTEthernet.

Below it is assumed that a constituent system, e.g., the constituent system 113, sends a periodic message with a length of 100 bytes, which contains the results of the calculation of the constituent system 113, to the constituent system 112 and simultaneously (in the multicast process) to the monitor component 130. The monitor component 130 interprets this message as a life-sign message of the component 113. In FIG. 2 the period of the life-sign message is designated with 260.

In the error-free case, the life-sign message is created at the creation time 210 and sent at the time of transmission 211. At the time point 212, the time of receipt of the expected life-sign message, the life-sign message arrives at the monitor component 130. Therefore, at the timeout time point 213 the timeout that monitors the arrival of the life-sign message, is not active. In this specific example, the duration of the life-sign message transport, i.e., the interval 250 between the send event 211 and the receive event 212, that is the transport duration, is 14 µs. The time interval between the events 210 and 211 or the events 222 and 223 must be at least 2 g, where g indicates the granularity of the global time, to ensure the time synchronization of these events (see [Kopetz, loc. cit., p. 62]).

Assume that the component 113 fails at time point 211. In this case, no message is generated at the creation time 210 of the life-sign message 220, and also no message is sent at the time of transmission 221. At the expected time of receipt 222 of the life-sign message, no life-sign message arrives at the monitor component 130, and therefore at the timeout time point 223 the timeout becomes active and triggers an error message or error handling. In this case, the error detection latency 270, i.e., the time interval between the failure 211 and the detection of the failure by the timeout 223, is 26 µs.

An estimate is made below of the error detection latency that results if the methodology of the prevailing prior art is used. According to this prevailing prior art there is no common global time to which the four constituent systems 110, 111, 112, 113, the message distribution unit 120, and the monitor component 130 have access. In this case, the constituent system 113 creates a life-sign message periodically, according to its unsynchronized local time, with a period of approximately 60 µs. As soon as a life-sign message arrives at the monitor component 130, a new timeout is set for monitoring the arrival of the next life-sign message. Since in this case the communications system must work on an event-driven basis, the transport duration fluctuates between the minimum transport duration of 14 µs and a worst-case maximum transport duration that cannot be exactly estimated. If it is assumed that in the worst case two long Ethernet messages with a transmission duration of 100 µs are in the communications queue, then the worst-case maximum transport duration is 214 µs, and the jitter, i.e., the difference between the minimum and maximum transport duration, is 200 µs. Since the timeout must be longer than the jitter, in this case a worst case error detection latency of more than 414 µs (maximum transport duration plus length of the timeout interval) results.

The following comparison of this specific example is an impressive illustration of the significant reduction of the worst-case error detection latency that is allowed by the invention.

Error detection latency 270 according to the invention: 26 µs.

Prior art error detection latency: 414 µs.

In [Kopetz, loc. cit.] it is proposed that in a cyclical computer system the message transport between the producer of a message and the consumer of a message be synchronized through the global time.

The invention proposes that in a cyclical system a life-sign message be sent in every cycle, that is also in all cycles in which the result is not yet provided, so that an error of the producer is immediately detected and the error detection latency is kept minimal.

In many applications it is possible to realize a constituent system on a single system on chip. A system on chip is a component known in microelectronics that contains the CPU, the memory, the input/output electronics, a communications controller, and the necessary software for a specified task. From the perspective of fault tolerance, a system on chip represents a clearly defined failure unit that must periodically send a life-sign message. After nonappearance of the life-sign message caused by a transient error, i.e., an error that corrupts the data stored in the volatile memory of the system on chip, but which has not permanently damaged the chip's hardware, it is useful to restart the entire system on chip by a reset message from the monitor component 130. Since most hardware errors are of a transient nature, such a procedure, connected with the rapid error detection, allows the functionality of the affected system on chip to be restored within a cycle.

The invention claimed is:

1. A process to detect a failure of a constituent system (110 . . . 113) in a system of systems (1) consisting of a number of constituent systems (111 . . . 113) which exchange messages through a communications system (120), wherein every constituent system (111 . . . 113) has a global time with a known granularity g, and at least one constituent system creates, at periodic creation times (210, 211) determined a priori from the progression of the global time, a time-triggered life-sign message, the time of transmission (211, 221) of this life-sign message in the time-triggered communications system (120), determined a priori from the progression of the global time, is synchronized with the creation time of this life-sign message, and the time of receipt (212, 222) of this life-sign message, determined a priori from the progression of the global time, is synchronized with the timeout time point (213, 223), determined a priori from the progression of the global time, of a monitor (130) of this life-sign message monitoring the arrival of the life-sign message, wherein an error message is triggered at the timeout time point if no life-sign message has arrived at the expected time of receipt (222).

2. The process of claim 1, wherein the time interval, measured with the global time, between the creation time (210, 220) of the life-sign message and the time of transmission (211, 221) of this message is n·g, where g means the granularity of the global time and n is a natural number where n≥2.

3. The process of claim 1, wherein the time interval, measured with the global time, between the time of receipt (212, 222) of the life-sign message and the timeout time point (213, 223) of this message is n·g, where g means the granularity of the global time and where n is a natural number where n≥2.

4. The process of claim 1, wherein an error handling process is begun with the triggering of the error message.

5. The process of claim 1, wherein a life-sign message is sent at the end of every cycle in a cyclical computer system.

* * * * *